United States Patent
Hiraiwa et al.

[11] Patent Number: 6,021,134
[45] Date of Patent: Feb. 1, 2000

[54] CELL/PACKET ASSEMBLY AND DISASSEMBLY APPARATUS AND NETWORK SYSTEM

[75] Inventors: Masashi Hiraiwa; Satoru Inazawa; Tatsuo Mochinaga, all of Yokohama; Kenji Kawakita, Urawa, all of Japan

[73] Assignees: Hitachi, Ltd., Tokyo; Hitachi Communications Systems, Inc., Yokohama, both of Japan

[21] Appl. No.: 08/949,437

[22] Filed: Oct. 14, 1997

Related U.S. Application Data

[63] Continuation of application No. 08/655,602, May 30, 1996, Pat. No. 5,734,653.

[30] Foreign Application Priority Data

Jun. 1, 1995 [JP] Japan ................................ 7-135159

[51] Int. Cl.[7] ............................................. H04J 3/24
[52] U.S. Cl. ................................... 370/474; 370/395
[58] Field of Search ................................ 370/465, 474, 370/524, 496, 410, 389, 394, 395

[56] References Cited

U.S. PATENT DOCUMENTS

| | | | |
|---|---|---|---|
| 5,170,394 | 12/1992 | Biber et al. ............... | 340/825.08 |
| 5,754,553 | 5/1998 | Shimoda .................. | 370/471 |
| 5,757,775 | 5/1998 | Yokoyama et al. ....... | 370/242 |
| 5,790,544 | 8/1998 | Aho et al. ................ | 370/395 |

*Primary Examiner*—Ajit Patel
*Attorney, Agent, or Firm*—Antonelli, Terry, Stout & Kraus, LLP

[57] ABSTRACT

A cell/packet assembly and disassembly apparatus is provided for efficiently connecting a line in a line switching system to an ATM network or a packet network, without causing congestion, to transmit and receive cells or packets therebetween. The cell/packet assembly and disassembly apparatus, upon detecting a call setting request outputted from a line switch board in response to a call originated from a terminal, starts cell assembly and cell disassembly of user information transmitted and received between a channel on a line in the line switching system corresponding to the call setting request and a virtual channel on the ATM network assigned to the channel. Also, when detecting a call setting request outputted from a predetermined virtual channel in the ATM network, the packet or cell assembly and disassembly apparatus starts cell assembly and cell disassembly of user information transmitted and received between the virtual channel on the ATM network corresponding to this call setting request and a channel on a line in the channel switching system assigned to the virtual channel.

11 Claims, 10 Drawing Sheets

FIG.4

| 300a | | 300b | | 300c | |
|---|---|---|---|---|---|
| $B_1$ | #1 | $B_1$ | #11 | $B_1$ | #11 |
| $B_2$ | #2 | $B_2$ | #12 | $B_2$ | #12 |
| $B_3$ | #3 | $B_3$ | #1 | $B_3$ | #21 |
| $B_4$ | #21 | $B_4$ | #2 | $B_4$ | #22 |
| $B_5$ | #22 | $B_5$ | #3 | $B_5$ | #23 |
| $B_6$ | #23 | $B_6$ | | $B_6$ | |
| $B_7$ | | $B_7$ | | $B_7$ | |
| ⋮ | ⋮ | ⋮ | ⋮ | ⋮ | ⋮ |
| $B_{23}$ | | $B_{23}$ | | $B_{23}$ | |
| $d_1$ | }#24 | $d_1$ | }#124 | $d_1$ | }#124 |
| $d_2$ | | $d_2$ | | $d_2$ | |
| $d_3$ | | $d_3$ | }#24 | $d_3$ | }#224 |
| $d_4$ | }#224 | $d_4$ | | $d_4$ | |
| $d_5$ | | $d_5$ | | $d_5$ | |
| $d_6$ | | $d_6$ | | $d_6$ | |
| $d_7$ | | $d_7$ | | $d_7$ | |
| ⋮ | ⋮ | ⋮ | ⋮ | ⋮ | ⋮ |
| $d_{23}$ | | $d_{23}$ | | $d_{23}$ | |

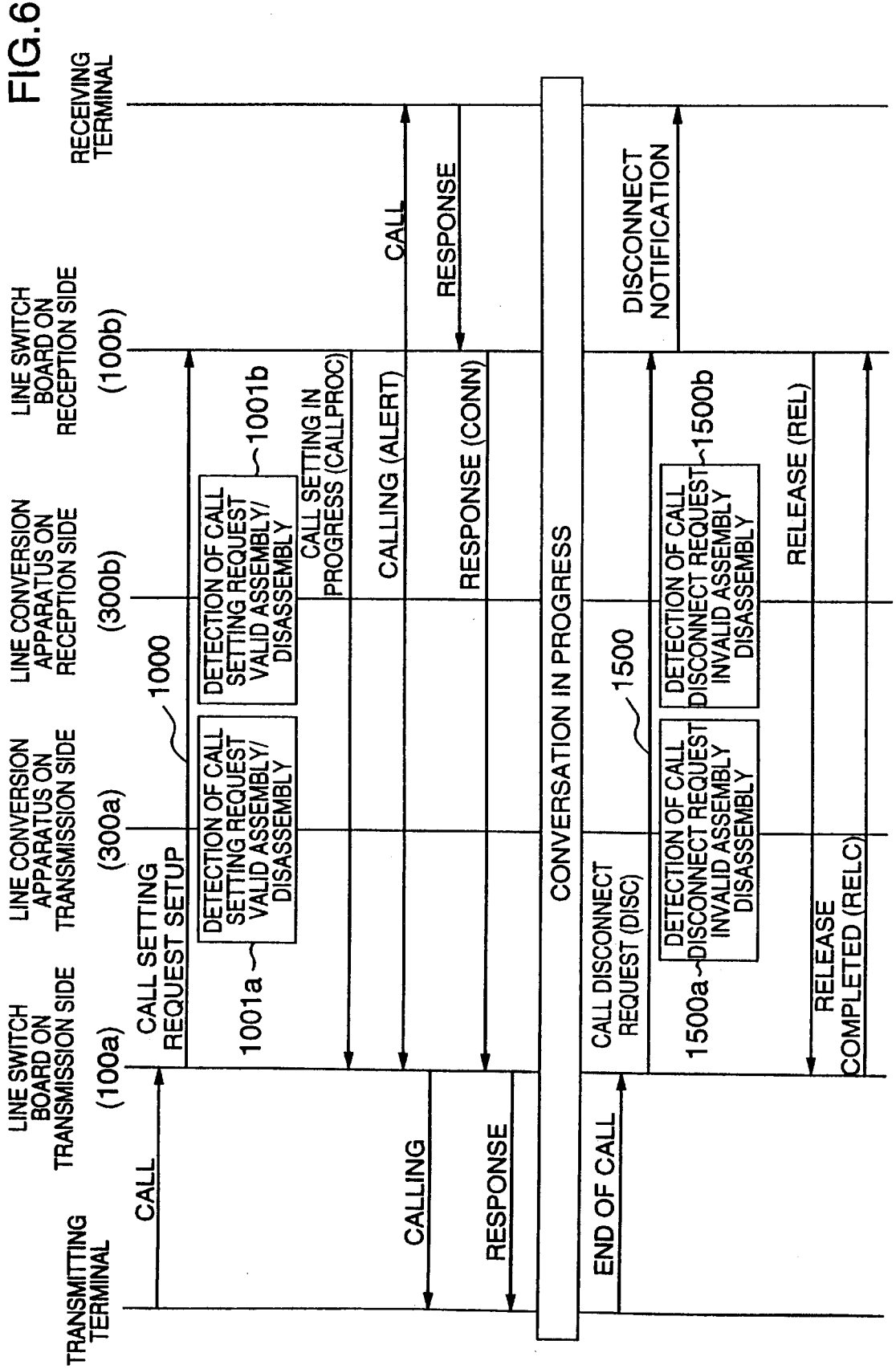

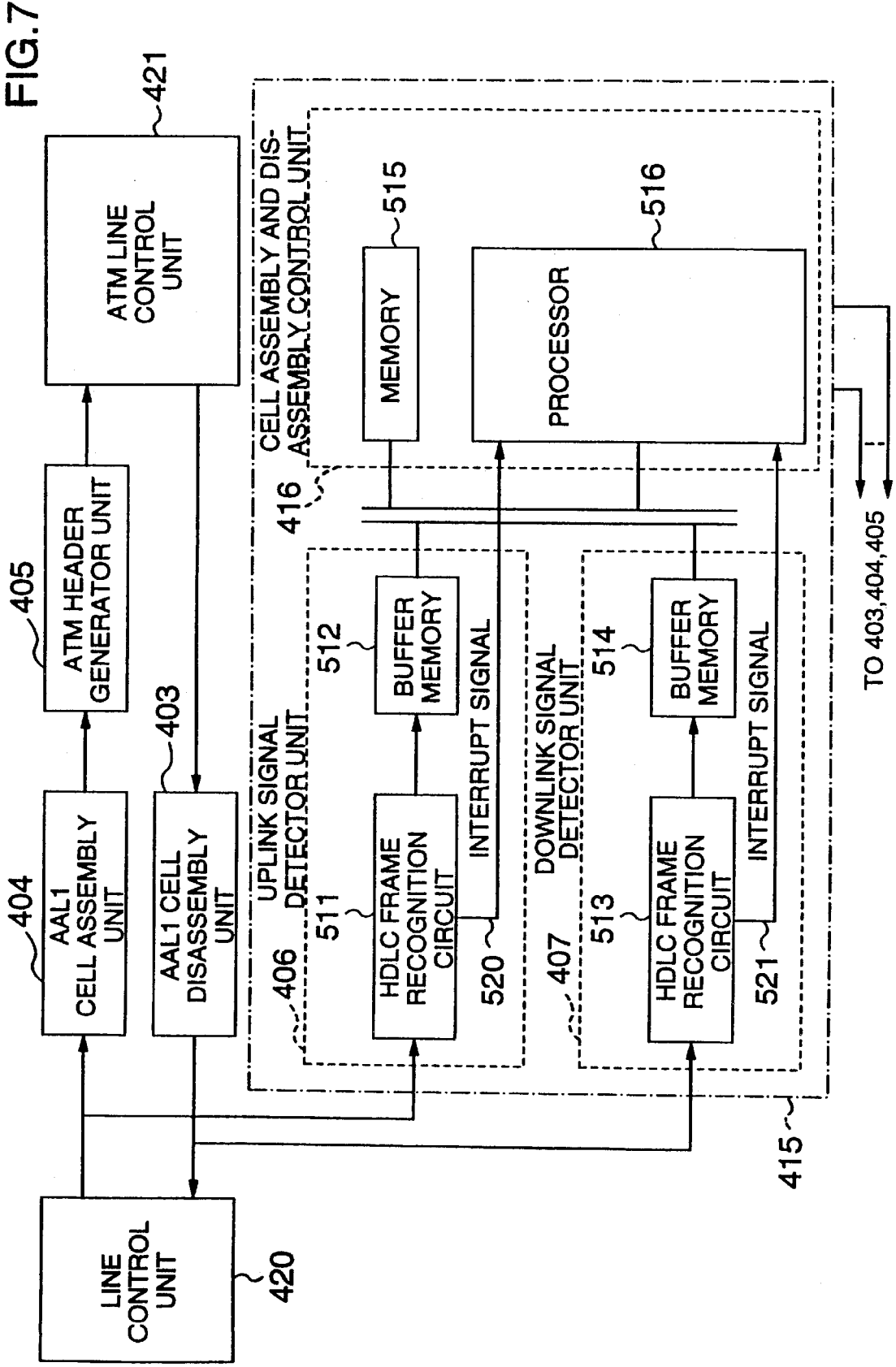

FIG.8(a)

| START FLAG | ADDRESS FIELD | CONTROL FIELD | INFORMATION FIELD | FCS | END FLAG |

FIG.8(b)

| PROTOCOL IDENTIFIER | CALL NUMBER LENGTH | CALL NUMBER | MESSAGE TYPE | INFORMATION ELEMENT |

CELL/PACKET ASSEMBLY AND DISASSEMBLY APPARATUS AND NETWORK SYSTEM

This is a continuation of application Ser. No. 08/655,602, filed May 30, 1996 now U.S. Pat. No. 5,734,653.

BACKGROUND OF THE INVENTION

1. Field of the Invention

The present invention relates to techniques for connecting a call originated in a line switching system to a network such as the ATM network or the like which switches packets or cells.

2. Description of the Related Art

Conventionally, it is known in general that a line in a line switching system is connected to an ATM network using a network as illustrated in a network configuration diagram of FIG. 11 in the following manner.

Referring specifically to FIG. 11, the network comprises line switch boards 100a, 100b, 100c; lines 200a, 200b, 200c in line switching systems; line conversion apparatuses 3000a, 3000b, 3000c; and an ATM network 400, wherein the line conversion apparatuses 3000a, 3000b, 3000c function as cell assembly and disassembly apparatuses. In the following, the line conversion apparatus 3000a is taken as an example to describe operations associated with the connection of a line in a line switching system to the ATM network.

The line conversion apparatus 3000a accommodates terminals in the line switching system such as the line switch board 100a and so on. On the line 200a in the line switching system, a plurality of logical communication paths (lines in the line switching system) are set (for example, three communication paths A, B, C) such that each of the communication paths A, B, C is previously corresponded permanently to another line switch board (100b or 100c) as a line switch board to be communicated. The line switch board 100a connects a call from a terminal accommodated therein to a communication path (A, B or C) corresponded to a line switch board (100b or 100c), which is the destination of the call, as a line switch board to be communicated. Conversely, the line switch board 100a connects a call from a line switch board as a communication party (100b or 100c) corresponded to each communication path, on which the call is incoming, to a destination terminal of the call accommodated in the line switch board 100a itself.

The line conversion apparatus 3000a sets a transmission virtual path to each of the communication lines A, B, C. Then, the line conversion apparatus 3000a assembles signals on the respective communication paths A, B, C incoming from the line switch board 100a into cells, adds a value indicative of a transmission virtual path, set to the communication path through which the signal has come in, to each corresponding cell as a header, and outputs the cells each having the header added thereto to the ATM network 400. The transmission virtual path is set to each communication path in such a manner that a virtual path defining a route to another line conversion apparatus (3000b or 3000c) connected to a line switch board as a communication party (100b or 100c) corresponded to the communication path is set as a transmission virtual path. The ATM network 400 transmits each cell to another line conversion apparatus (3000b or 3000c) specified in the header of the cell. Also, the line conversion apparatus 3000a sets a reception virtual path in the reverse direction to each of the communication lines A, B, C. Then, the contents of a cell incoming from the ATM network 400 are outputted to a communication path to which a virtual path indicated by the header in the cell is corresponded as a reception virtual path. In this event, set as the reception virtual path is one of virtual paths which is used as a transmission virtual path to the line conversion apparatus 3000a itself by another line conversion apparatus connected to a line switch board as a communication party corresponded to the communication path.

In the configuration described above, the line conversion apparatus 3000a always connects the communication paths A, B, C on the line 200 in the line switching system to virtual paths on the ATM network 400 to enable calls on respective communication paths on lines in the line switching system to be switched using the ATM network 400. The line conversion apparatus 3000a of the type mentioned above is described, for example, in JP-A-6-85836.

SUMMARY OF THE INVENTION

Since the conventional line conversion apparatus 3000 always outputs cells to the ATM network irrespective of whether a call is present on the communication path A, B or C on the line 200 in the line switching system, the ATM network 400 may be fed with cells including meaningless information as information to be transmitted and received between terminals, and these useless cells are switched, thus causing a problem on an efficient utilization of the ATM network 400. Similar problems may occur not only in the ATM network but also for the case where lines in a line switching system are connected to a packet switching network.

It is therefore an object of the present invention to provide a cell/packet assembly and disassembly apparatus which is capable of increasing a utilization efficiency of a network such as an ATM network which switches packets or cells.

To achieve the above object, the present invention provides a cell/packet assembly and disassembly apparatus for connecting a line in a line switching system to a network which performs packet switching or asynchronous transfer mode (ATM) switching, comprising:

user information connecting means for assembling a packet or a cell including user information inputted from a line in the line switching system and transmitting the packet or the cell through the network to a receiving party of a call containing the user information, and for disassembling a packet or a cell including user information inputted from the network to receive the user information from a calling party originating a call containing the user information through the line in the line switching system;

signal control information connecting means for assembling a packet or a cell including signal control information inputted from a line in the line switching system and transmitting the packet or the cell through the network to a receiving party of a call containing the signal control information, and for disassembling a packet or a cell including signal control information inputted from the network to receive the signal control information from a calling party originating a call containing the signal control information through the line in the line switching system;

signal detecting means for detecting a communication start request and a communication end request included in signal control information inputted from the line in the line switching system, and a communication start request and a communication end request included in signal control information restored by disassembling a packet or a cell inputted from the network; and control means for controlling the user information connecting means to start assembling or disassembling a packet or a cell including user information of a call containing the communication start request when the signal detecting means detects the communication start request, and to stop assembling or disassembling the packet or the cell including the user information of the call containing the communication end request when the signal detecting mean detects the communication end request.

Specifically, since the control means controls the user information connecting means to start assembling or disassembling a packet or a cell including user information of a call containing a communication start request when the signal detecting means detects the communication start request, and to stop assembling or disassembling the packet or the cell including the user information of the call containing a communication end request when the signal detecting means detects the communication end request, it is possible to prevent cells including no user information from outgoing to the network when no call exists on a line in the line switching system, such as before requesting a communication to start, after requesting a communication to end, and so on, thus providing a cell/packet assembly and disassembly apparatus capable of achieving efficient utilization of the network.

BRIEF DESCRIPTION OF THE DRAWINGS

FIG. 4 is an explanatory diagram showing how channels on a primary rate interface are assigned to virtual channels on an ATM network in the cell/packet assembly and disassembly apparatus according to the present invention;

FIG. 6 is a communication sequence diagram showing a sequence of operations performed in a network which employs the cell/packet assembly and disassembly apparatus according to the present invention;

FIG. 7 is a block diagram illustrating the configuration of a signal control unit used in the cell/packet assembly and disassembly apparatus according to the present invention;

FIG. 8 is diagrams illustrating frame structures for ISDN Layer 2 and Layer 3;

DESCRIPTION OF THE PREFERRED EMBODIMENTS

A cell/packet assembly and disassembly apparatus (hereinafter called the "line conversion apparatus") according to the present invention will hereinafter be described in detail with reference to the accompanying drawings in connection with an exemplary embodiment applied to an ATM network.

Figure 1:
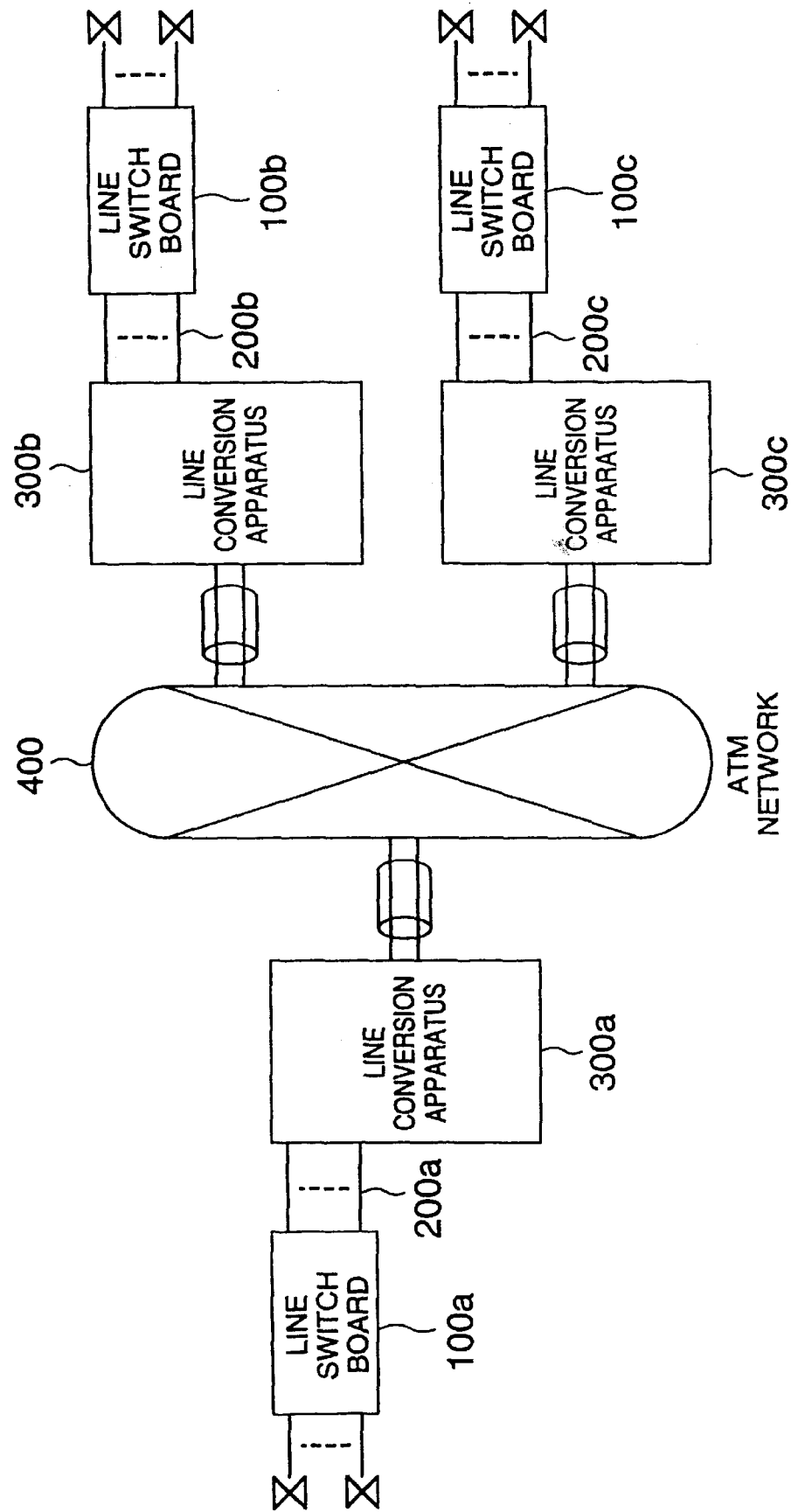
FIG. 1 is a block diagram illustrating a basic configuration of a network system which employs cell/packet assembly and disassembly apparatuses according to the present invention.
Figure 11:
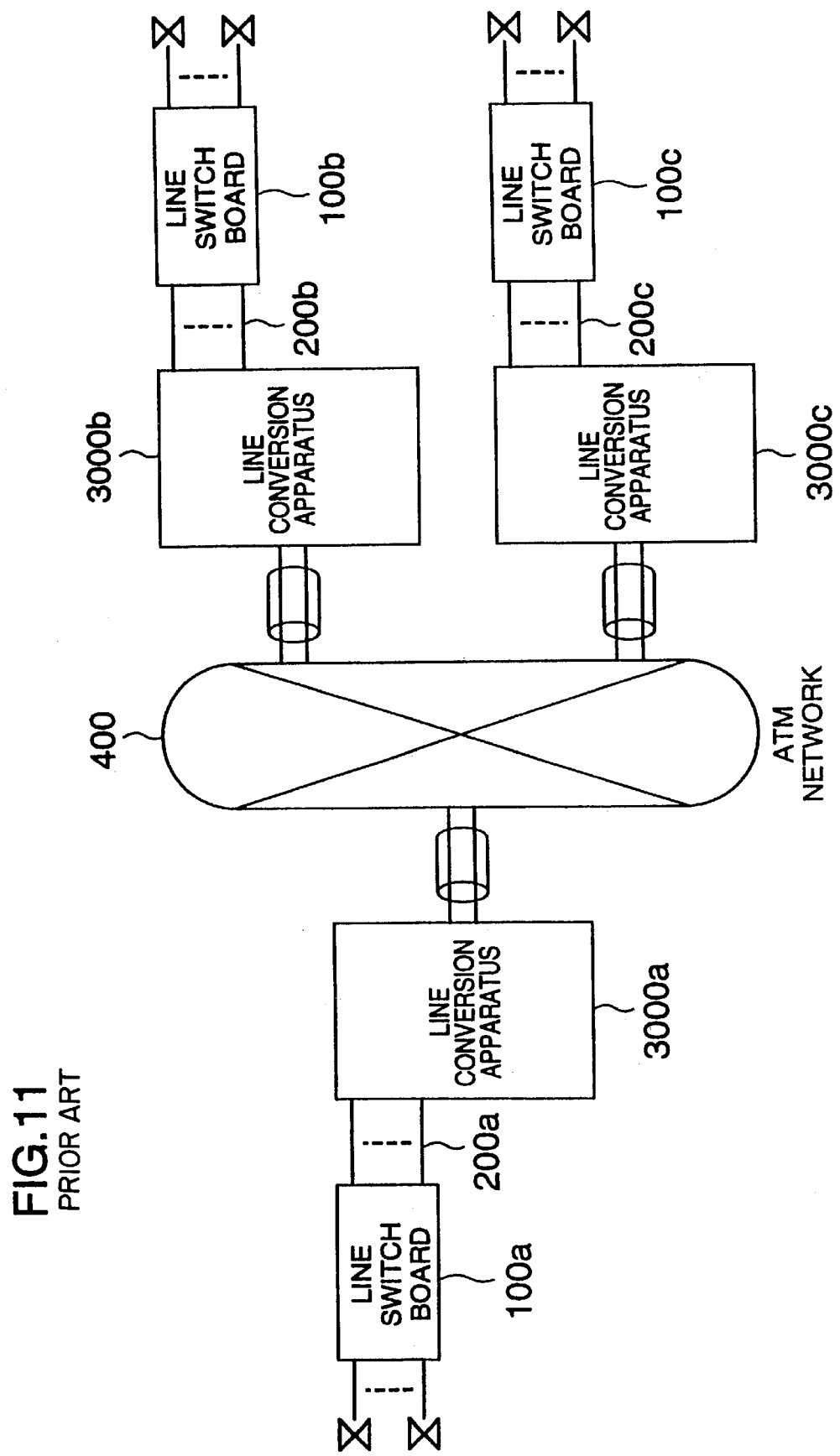
FIG. 11 is a diagram illustrating the configuration of a network system using conventional line conversion apparatuses.

FIG. 1 is a block diagram illustrating the configuration of a network system to which the line conversion apparatus according to the present invention is applied. The illustrated network system has substantially the same configuration as the conventional network system of FIG. 11, and specifically comprises line switch-boards 100a, 100b, 100c; lines 200a, 200b, 200c in line switching systems; line conversion apparatuses 300a, 300b, 300c according to the present invention; and an ATM network 400. More specifically, the plurality of line conversion apparatuses 300a, 300b, 300c are connected to the ATM network 400, and the line switch boards 100a, 100b, 100c are accommodated in the line conversion apparatuses 300a, 300b, 300c through the lines 200a, 200b, 200c in the line switching systems, respectively.

Figure 2:
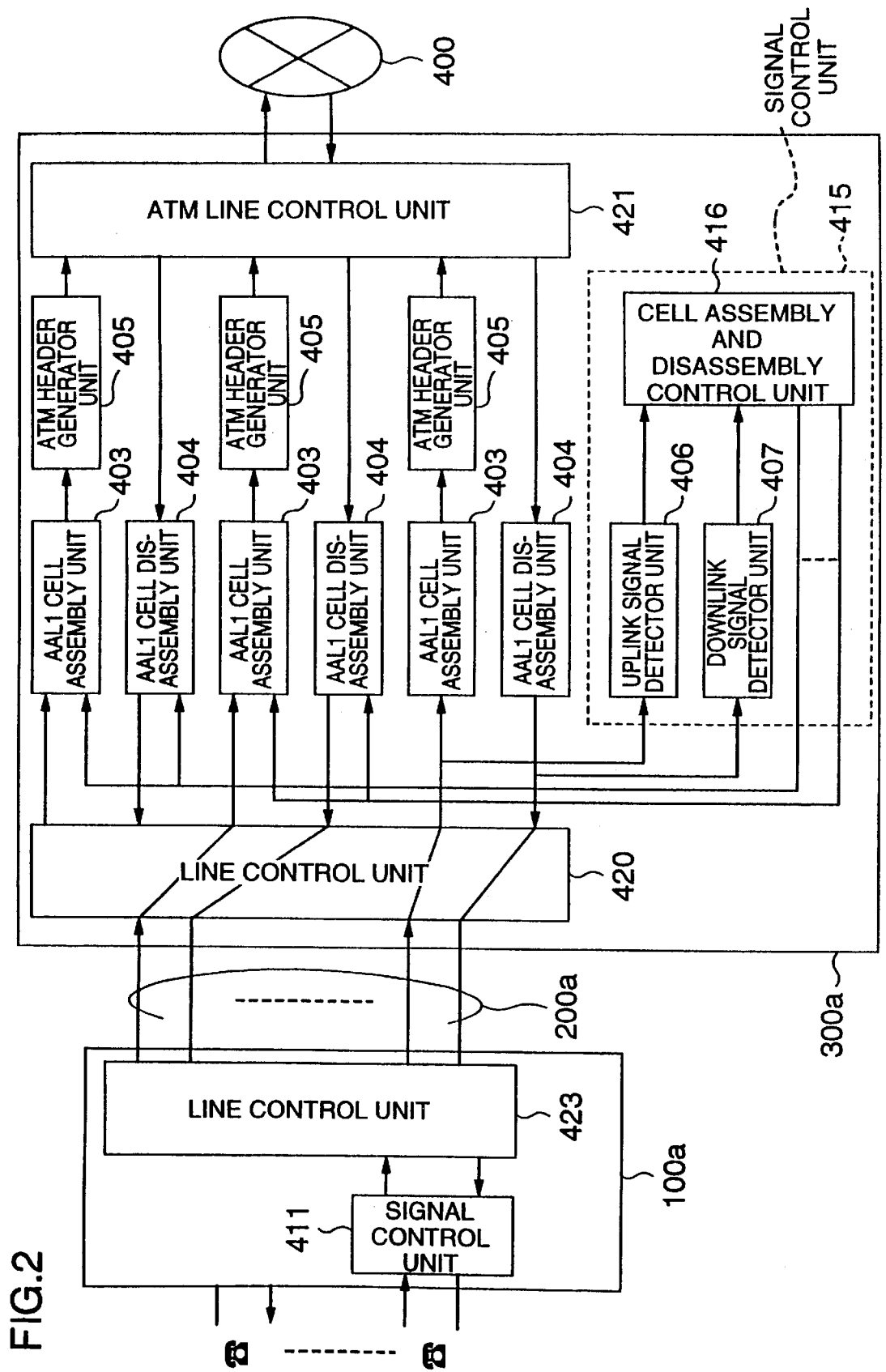
FIG. 2 is a block diagram illustrating the configuration of a cell/packet assembly and disassembly apparatus according to the present invention.

Next, the configuration of the line conversion apparatuses 300a, 300b, 300c will be described with reference to the block diagram of FIG. 2. It should be noted that since the line conversion apparatuses 300a, 300b, 300c have the same configuration, the following description is made on the line conversion apparatus 300a taken as an example.

The line conversion apparatus 300a according to the present invention comprises a line control unit 420 serving as an interface with the line 200a in the line switching system and an ATM line control unit 421 serving as an interface with the ATM network 400. Also, the line conversion apparatus 300a comprises a plurality of circuit sets for executing cell assembly and disassembly processing, each composed of an AAL1 cell assembly unit 403 for assembling signals into cells in conformity to a protocol defined by the ATM adaptation layer type 1; an AAL1 cell disassembly unit 404 for disassembling cells to signals; and an ATM header generator unit 405 for generating and adding a header to each data in the form of cell. Each circuit set is provided corresponding to one channel on the line 100a in the line switching system. The line conversion apparatus 300a also comprises a signal control unit 415, constituting a feature of the present invention, which is composed of an uplink signal detector unit 406 and a downlink signal detector unit 407, both for detecting call control signals, and a cell assembly and disassembly control unit 416.

Figure 3:
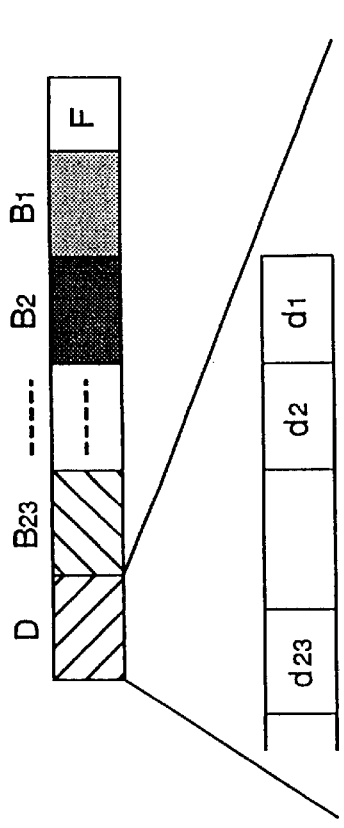
FIG. 3 is a diagram illustrating a frame structure for explaining a channel configuration in an ISDN primary rate interface.

Next, a channel configuration on the lines 200a, 200b, 200c in the line switching systems will be described with reference to FIG. 3 illustrating a signal frame structure. The following description will be made on an example in which the ISDN primary rate interface is applied to the signal interface.

A total of 24 channels (23B+D) are provided on each of the lines 200a, 200b, 200c in the line switching systems. Here, B-channels B1–B23 are assigned to transfer user information, and the D-channel is assigned to transfer signal information on each of the B-channels B1–B23. The D-channel covers 23 channels corresponding to the channels B1–B23 (in this specification, these channels are designated by d1–d23, and each of channels d1–d23 is called a "d-channel"), and the respective channels d1–d23 transfer call control messages or the like for their corresponding B-channels. Note that a field F at the beginning of the frame includes information indicative of the head of the signal frame.

Next, an ATM cell switched by the ATM network 400 will be described. The ATM cell is composed of a header and an information field including data to be transferred. The header contains virtual path identification information VPI for identifying a path between a call originating terminal and a destination terminal and virtual channel identification information VCI for identifying a virtual channel on the virtual path. In other words, a particular virtual channel is specified by VPI, VCI. Thus, the ATM network 400 switches an ATM cell transmitted from a call originating terminal to a destination terminal in accordance with this VPI in the header.

In the following, the operation of the line conversion apparatus 300a according to the present invention will be described for an exemplary case in which a call is originated from the line switch board 100a and destined to the line switch board 100b in the network illustrated in FIG. 1.

In this embodiment, a plurality of virtual channels are previously set between the respective line conversion apparatuses 300a, 300b and 300c. For example, virtual channels Ch1, Ch2, Ch3 and Ch24 are set as virtual channels from the line conversion apparatus 300a to the line conversion apparatus 300b. Also, virtual channels Ch101, Ch102, Ch103 and Ch124 are set as virtual channels from the line conversion apparatus 300b to the line conversion apparatus 300a. In addition, a pair of a virtual channel from the line conversion apparatus 300a to the line conversion apparatus 300b and a virtual channel from the line conversion apparatus 300b to the line conversion apparatus 300a are set as a bi-directional virtual channel. For example, Ch1 and Ch101 form a bi-directional virtual channel #1; Ch2 and Ch102 form a bi-directional virtual channel #2; Ch3 and Ch103 form a bi-directional virtual channel #3; Ch24 and Ch124 form a bi-directional virtual channel #24; and so on.

With the virtual channels set as described above, when a terminal (for example, a telephone) accommodated in the line switch board 100a outputs a communication request to a terminal accommodated in the line switch board 100b, the line switch board 100a analyzes the telephone number or the like of the destination of the call included in the communication request from the terminal to determine a line switch board to which the call is to be connected (the line switch board 100b in this example), and assigns any of channels B1–B23 in the uplink direction (direction from the line switch board 100a to the line conversion apparatus 300a) on the line 200a in the line switching system for transferring user information from the terminal.

Each of the line conversion apparatuses 300a, 300b, 300c of this embodiment is configured such that the line switch boards 100a, 100b, 100c, which transmit and receive calls therebetween, are previously corresponded to a group of B-channels which can be assigned to the calls. For example, the previously defined configuration is such that B-channels in a group consisting of channels B1–B3 can only be assigned to calls from the line switch board 100a to the line switch board 100b. Also, each of the B-channels is previously assigned, on a one-by-one basis, a bi-directional virtual channel between one line switch board and another line switch board which transmits and receives calls which can be assigned to the associated B-channel. For example, the bi-directional virtual channels #1–#3 between the line conversion apparatuses 300a and 300b are assigned to the channels B1–B3, respectively, to which calls between the line switch boards 100a and 100b can be assigned.

Also, in accordance with the correspondence between the line switch board, to which a call is to be connected, and the uplink channels B1–B23, uplink channels d1–d23 are also previously corresponded to the line switch board 100b which should transmit and receive signals on these channels in consequence. Each of these uplink channels d1–d23 is also assigned a bi-directional virtual channel to each of line switch boards to which signals should be connected. For example, assigned to the channels d1–d3, to which call control signals can be assigned for calls to be connected to the line switch board 100b, is the bi-directional virtual channel #24 formed between the line conversion apparatus 300a and the line conversion apparatus 300b connected to the line switch board 100b. It should be noted that each of the d-channels may be assigned a bi-directional virtual channel on a one-by-one basis.

In the explanatory diagram of FIG. 4 showing an example of the channel assignment in each of the line conversion apparatuses 300a, 300b, 300c described above, the channel assignment is determined such that one B-channel corresponds to one B-channel on a one-by-one basis through a bi-directional virtual channel among the line conversion apparatuses 300a, 300b, 300c. Also, the assignment is determined such that one or plurality of d-channels correspond to one or a plurality of d-channels through a bi-directional virtual channel on a one-by-one basis. Further, the assignment is determined such that a B-channel in the line conversion apparatus 300a and a d-channel for transmitting call control information for the B-channel correspond to a B-channel in the line conversion apparatus 300b and a d-channel for transmitting call control information for the B-channel. The correspondence defined in the assignment as described above is previously stored in the signal control unit 415 of the respective line conversion apparatuses 300a, 300b, 300c.

It is assumed in the following description on the operation that the line switch board 100a assigns the channel B2 to a call from an associated terminal.

A signal control unit 411 in the line switch board 100a uses the channel d2 corresponding to the channel B2 assigned through a line control unit 423 to output a call setting request directed to the line switch board 100b, which is the destination of the call, to the line conversion apparatus 300a.

The AAL1 cell assembly unit 403 in the line conversion apparatus 300a always assembles signals on the channels d1–d23 into cells. The assembly of signals on the channels d1–d23 into cells is performed for each of assigned virtual channels. For example, signals on the channels d1–d3, to which a bi-directional virtual channel #24 is assigned, are collectively assembled into cells. The AAL1 cell disassembly unit 404, on the other hand, always disassembles cells received on a virtual channel in the receiving direction forming a bi-directional virtual channel assigned to the three channels d1–d3, and sends restored signals through the line control unit 420 to the line switch board 100a as signals for a channel within the channels d1–d23 which has been assigned to the virtual channel.

The ATM header generator unit 405 generates and adds a header to each of cells which have been assembled from signals on the channels d1–d23. Specifically, the header includes identification information for identifying a virtual channel in the transmitting direction forming a bi-directional virtual channel assigned to a channel (d1–d23) which has been stored in each cell. Then, the cells each having the header added thereto are transmitted to the ATM network 400 through the ATM line control unit 421. For example, cells assembled from signals on channels d1–d3 are each added a header including VPI and VCI for specifying the virtual channel Ch24 forming the bi-directional virtual channel #24, and transmitted to the ATM network 400. Thus, a call setting request on the channel B2 sent from the line switch board 100a through the channel d2 is sent to the line conversion apparatus 300b through the virtual channel Ch24#.

Further, when the uplink signal detector unit 406 in the line conversion apparatus 300a detects that a call setting request for requesting call setting has been sent from the line switch board 100a through the channel d2 as call control information, the cell assembly and disassembly control unit 416 instructs the AAL1 cell assembly unit 403 to start the assembly into cells of signals received from the line switch board 100a through the channel B2 corresponding to the channel d2. Also, the cell assembly and disassembly control unit 416 instructs the AAL1 cell disassembly unit 404 to start the disassembly of cells on a virtual channel Ch1O2 in the receiving direction forming the bi-directional channel #2 which has been assigned to the channel B2. As will be described later in detail, in this embodiment, the AAL1 cell assembly unit 403 is controlled not to perform the assembly into cells of signals on B-channels not in use for communications, while the AAL1 cell disassembly unit 404 is controlled not to perform the disassembly of cells on virtual channels in the receiving direction forming bi-directional channels assigned to B-channels which are not in use for communications.

The AAL1 cell assembly unit 403, upon receiving an instruction to start the cell assembly, starts assembling signals on the channel B2 into cells. The ATM header generator unit 405 adds a header including identification information for identifying the virtual channel Ch2 in the transmitting direction forming the bi-directional virtual channel assigned to the channel B2 to each of the cells assembled from the signals on the channel B2. Then, the cells each having the header added thereto are transmitted to the ATM network 400 through the ATM line control unit 421. Also, the AAL1 cell disassembly unit 404 disassembles cells on the indicated virtual channel Ch1O2, and transmits restored signals to the line switch board 100a through the line control unit 420 as signals on the channel B2 assigned to the bi-directional virtual channel #2 formed by the virtual channel Ch2.

In this way, by the line conversion apparatus 300a, a B-channel (B2) on the line 200a in the line switching system is bi-directionally connected to one of bi-directional virtual channels (#2) set on the ATM network 400, and a signal on a d-channel (d2) for transmitting a call control signal for this B-channel is bi-directionally connected to one of bi-directional virtual channels (#24) set on the ATM network 400.

Corresponding to the foregoing operation of the line conversion apparatus 300a, the line conversion apparatus 300b, which is the opposite party of the line conversion apparatus 300a, operates in the following manner.

The AAL1 cell disassembly unit 404 always disassembles cells received through virtual channels in the receiving direction forming bi-directional virtual channels assigned to signals on the channels d1–d23, and sends restored signals to the line switch board 100a through the line control unit 420 as signals on channels, within the channels d1–d23, assigned to the virtual channels. More specifically, when a call setting request is sent from the line conversion apparatus 300a through the bi-directional virtual channel #24, the call setting request is outputted to the channel d4 through the line conversion apparatus 300b in accordance with the assignment correspondence shown in FIG. 4. It should be noted that, similarly to the corresponding components in the line conversion apparatus 300a, the AAL1 cell assembly unit 403 in the line conversion apparatus 300b also always assembles signals on the channels d1–d23 into cells, and that the ATM header generator unit 405 generates and adds a header to each of cells assembled from signals on channels d1–d23, the header including identification information for identifying a virtual channel in the transmitting direction forming a bi-directional virtual channel assigned to a channel (d1–d23) which has been stored in each cell, and transmits the cells each having the header added thereto to the ATM network 400 through the ATM line control unit 421.

When the call setting request is outputted to the channel d4 and the downlink signal detector unit 407 in the line conversion apparatus 300b detects that the call setting request has been sent through the channel d4, the cell assembly and disassembly control unit 416 instructs the AAL1 cell assembly unit 403 to start the assembly into cells of signals received from the line switch board 100b through the channel B4 corresponding to this channel d4. Also, the cell assembly and disassembly control unit 416 instructs the AAL1 cell disassembly unit 404 to start the disassembly of cells on the virtual channel Ch2 in the receiving direction forming the bi-directional channel #2 assigned to the channel B4. It should be noted that, also in the line conversion apparatus 300b, the AAL1 cell assembly unit 403 is controlled not to perform the assembly into cells of signals on B-channels not in use for communications, while the AAL1 cell disassembly unit 404 is controlled not to perform the disassembly of cells on virtual channels in the receiving direction forming bi-directional channels assigned to B-channels which are not in use for communications.

The AAL1 cell assembly unit 403, upon receiving an instruction to start the cell assembly, starts assembling signals on the channel B4 into cells. The ATM header generator unit 405 adds a header to each of cells assembled from the signals on the channel B4, the header including identification information for identifying the virtual channel Ch1O2 in the transmitting direction forming the bi-directional virtual channel #2 assigned to the channel B4, and transmits the cells each having the header added thereto to the ATM network 400 through the ATM line control unit 421. The AAL1 cell disassembly unit 404, in turn, disassembles cells on the indicated virtual channel Ch2 and sends restored signals to the line switch board 100a through the line control unit 420 as signals on the channel B4 assigned to the bi-directional virtual channel #2 formed by the virtual channel Ch2.

In this way, the channel B2 and the channel b2 on the line 200a in the line switching system are bi-directionally connected to the channel B4 and the channel d4 on the line 200b in the line switching system through the bi-directional virtual channel #2.

Figure 5:
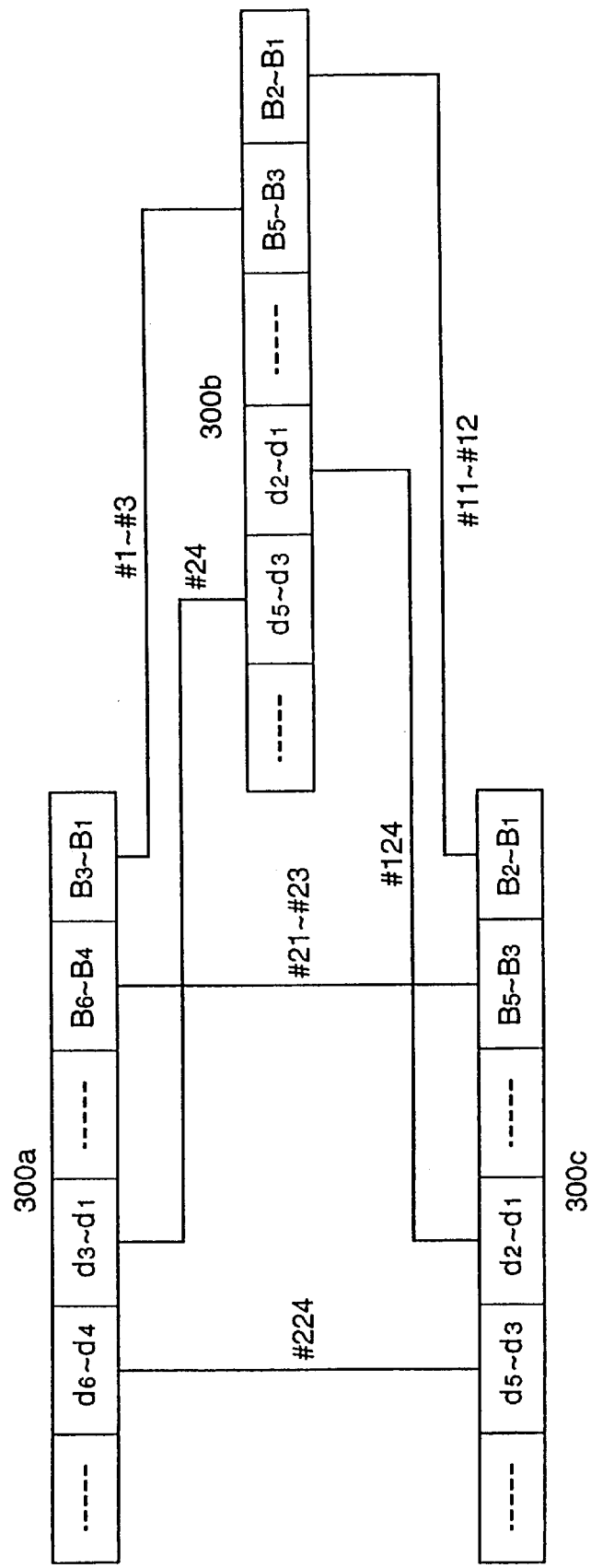
FIG. 5 is an explanatory diagram showing a connection relationship between channels on the primary rate interface in a network which employs the cell/packet assembly and disassembly apparatus according to the present invention.

According to the line conversion apparatus of the present invention as described above, a set of arbitrary B-channel and d-channel on a line in a line switching system can be connected to a set of arbitrary B-channel and d-channel on a line in another line switching system through the ATM network. In addition, since cells for transmitting and receiving information on a B-channel are passed through the ATM network only when a call is being set, a highly efficient network system can be realized. The connection relationship between the line conversion apparatuses 300a–300c heretofore described in the foregoing embodiment is shown in the explanatory diagram of FIG. 5. more specifically, FIG. 5 schematically represents the connection relationship between B-channels and d-channels realized by the channel assignment shown in FIG. 4.

As described above, the line conversion apparatus 300 of the present invention controls the AAL1 cell assembly unit 403 not to perform the assembly into cells of signals on a B-channel not in use for communications, and also controls AAL1 cell disassembly unit 404 not to perform the disassembly of cells on a virtual channel in the receiving direction forming a bi-directional channel assigned to a B-channel not in use for communications. This control operation of the line conversion apparatus 300 will be described below.

In a state in which the AAL1 cell assembly unit 403 is assembling signals into cells and the AAL1 cell disassembly unit 404 are disassembling cells, if the downlink signal detector unit 407 or the uplink signal detector unit 406 detects a call disconnect request for requesting disconnection of a call on a d-channel on which the cell assembly and the cell disassembly are being performed, the cell assembly and disassembly control unit 416 controls the AAL1 cell assembly unit 403 and the AAL1 cell disassembly unit 404 to stop the cell assembly and the cell disassembly on the B-channel. Thus, afterward, the AAL1 cell assembly unit 403 and the AAL1 cell disassembly unit 404 do not perform the cell assembly and the cell disassembly on the B-channel until the downlink signal detector unit 407 or the uplink signal detector unit 406 detects a new call setting request. This results in outputting meaningless cells to the ATM network 400, thus avoiding a degraded efficiency of the network. Since the assembly of signals on a d-channel into cells is performed asynchronously with the assembly of signals on a B-channel into cells, cells to be disassembled may not exist in the AAL1 cell disassembly unit 404 immediately after the cell assembly and the cell disassembly have been started or immediately before the cell assembly and the cell disassembly are stopped. To solve this problem, the line conversion apparatus 300 of the present invention is configured such that the AAL1 cell disassembly unit 404 outputs data, for example, indicating that its contents are all zero, as restored signals on the B-channel. In this way, the network is protected from erroneous operations caused by indefinite data outputted to a line switch board or to a terminal.

A sequence of exemplary operations performed for the cell assembly and the cell disassembly, heretofore described above, will be next explained along a communication sequence diagram of FIG. 6.

In this example, assume that a communication request from a transmitting terminal causes a line switch board (100a) on the transmission side to transmit a call setting request (SETUP) signal (1000), including information for setting a communication path, to a d-channel (d2). This call setting request is relayed (d2→d4) by line conversion apparatuses (300a, 300b) on the transmission side and on the reception side to a line switch board (100b) on the reception side through a bi-directional virtual channel (#24). During this relay operation, the line conversion apparatuses (300a, 300b) on the transmission side and on the reception side, when their respective signal detector units (406, 407) detect a call setting request, start the assembly of signals into cells on a corresponding bi-directional virtual channel (#2) and the disassembly of cells on the bi-directional virtual channel (#2) (1001a, 1001b). Also, the line switch board (100a) on the transmission side generates a call disconnect request (DISC) signal (1500) including information for releasing the communication path in response to a communication end request from the terminal, and transmits the call disconnect request to the d-channel (d2). This call disconnect request is relayed by the line conversion apparatuses (300a, 300b) on the transmission side and on the reception side to the line switch board (100b) on the reception side through the bi-directional virtual channel (#24). During this relay operation, the line conversion apparatuses (300a, 300b), when their respective signal detector units (406, 407) detect the call disconnect request, stop the assembly of signals into cells on a corresponding bi-directional virtual channel (#2) and the disassembly of cells on the bi-directional virtual channel (#2) (1501a, 1501b).

Next, the signal control unit 415 responsible to the control of the cell assembly and the cell disassembly performed in the line conversion apparatus 300 of the present invention will be described in detail. FIG. 7 is a block diagram illustrating the line conversion apparatus 300 of the present invention including a detailed configuration of the signal control unit 415.

This embodiment employs the LAP-D procedure for Layer 2 protocol and the Q.931 procedure for Layer 3 protocol, both used in the ISDN lines as protocols for call control signals. FIG. 8 illustrates frame structures for call control signals. Specifically, (a) illustrates a frame structure for Layer 2, and (b) a frame structure for Layer 3.

Next, the operation of the signal control unit 415 will be described below with reference to FIGS. 7, 8.

The uplink signal detector unit 406 and the downlink signal detector unit 407 respectively extract Layer 2 frame data illustrated in (a) of FIG. 8 by HDLC frame recognition circuits 511, 513 on respective d-channels, temporarily store the Layer 2 frame data in buffer memories 512, 513, and generate interrupt signals 520, 521 to a processor 516 in the cell assembly and disassembly control unit 416. The processor 516 executes a program for cell assembly control processing stored in a memory 515 to check whether or not the frames stored in the buffer memories 512, 513 conform to the Layer 2 protocol and the Layer 3 protocol. The processor 516 also examines whether a call setting request signal or a call disconnect request signal is included in the Layer 3 frame illustrated in (b), and controls the cell assembly and the cell disassembly on a corresponding B-channel in the AAL1 cell assembly unit 403 and the AAL1 cell disassembly unit 404, if such a request is included therein.

Also, the memory 515 previously stores the contents of the assignment of respective virtual channels, B-channels and d-channels as shown in FIG. 4 for explaining the assignment of channels. The processor 516 controls each of the AAL1 cell assembly unit 403, the AAL1 cell disassembly unit 404, the ATM header generator unit 405 and so on such that respective virtual channels, B-channels and D-channels have the correspondence and assignment relation therebetween in accordance with the contents stored in the memory 515.

According to the present invention, the line conversion apparatus may be provided in a configuration different from the configuration described in the foregoing embodiment. In the following, a different configuration of the line conversion apparatus will be described with reference to the drawings.

Figure 9:
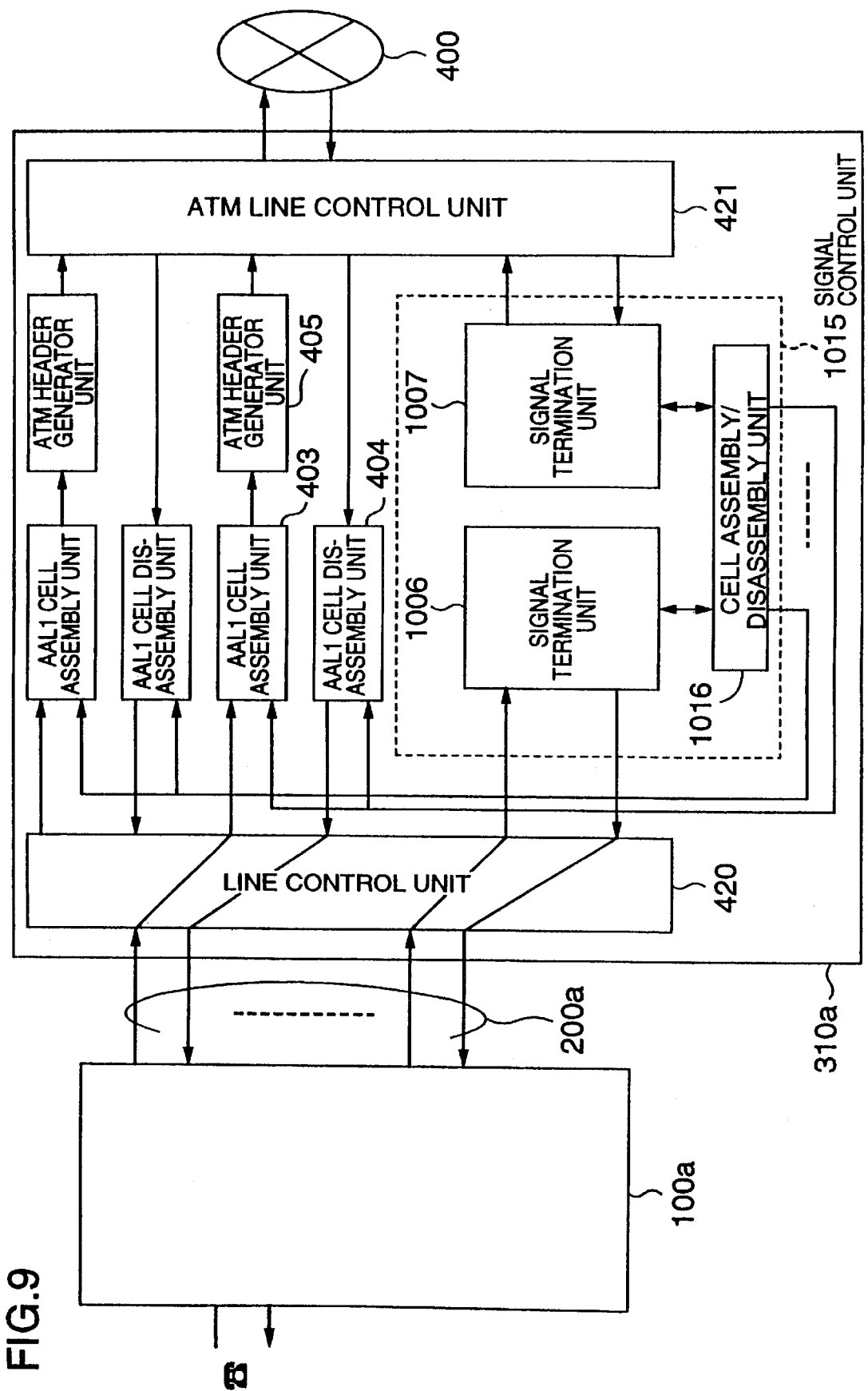
FIG. 9 is a block diagram illustrating another configuration of the cell/packet assembly and disassembly apparatus according to the present invention.

FIG. 9 is a block diagram illustrating the configuration of another line conversion apparatus 310a according to the present invention. The line conversion apparatus 310a has substantially the same configuration as the line conversion apparatus 300a illustrated in FIG. 2, except that the line conversion apparatus 310a comprises a signal control unit 1015 having a different internal configuration, instead of the signal control unit 415 and processes signals on d-channels only by the signal control unit 1015.

More specifically, in the line conversion apparatus 310a of this embodiment, the signal control unit 1015 is composed of a signal terminal unit 1006 on the line switching system side, a signal terminal unit 1007 on the ATM line side, and a cell assembly and disassembly control unit 1016.

In the following, portions in this embodiment different from the foregoing embodiment will be described, laying stress on the operation of the signal control unit 1015.

Figure 10:
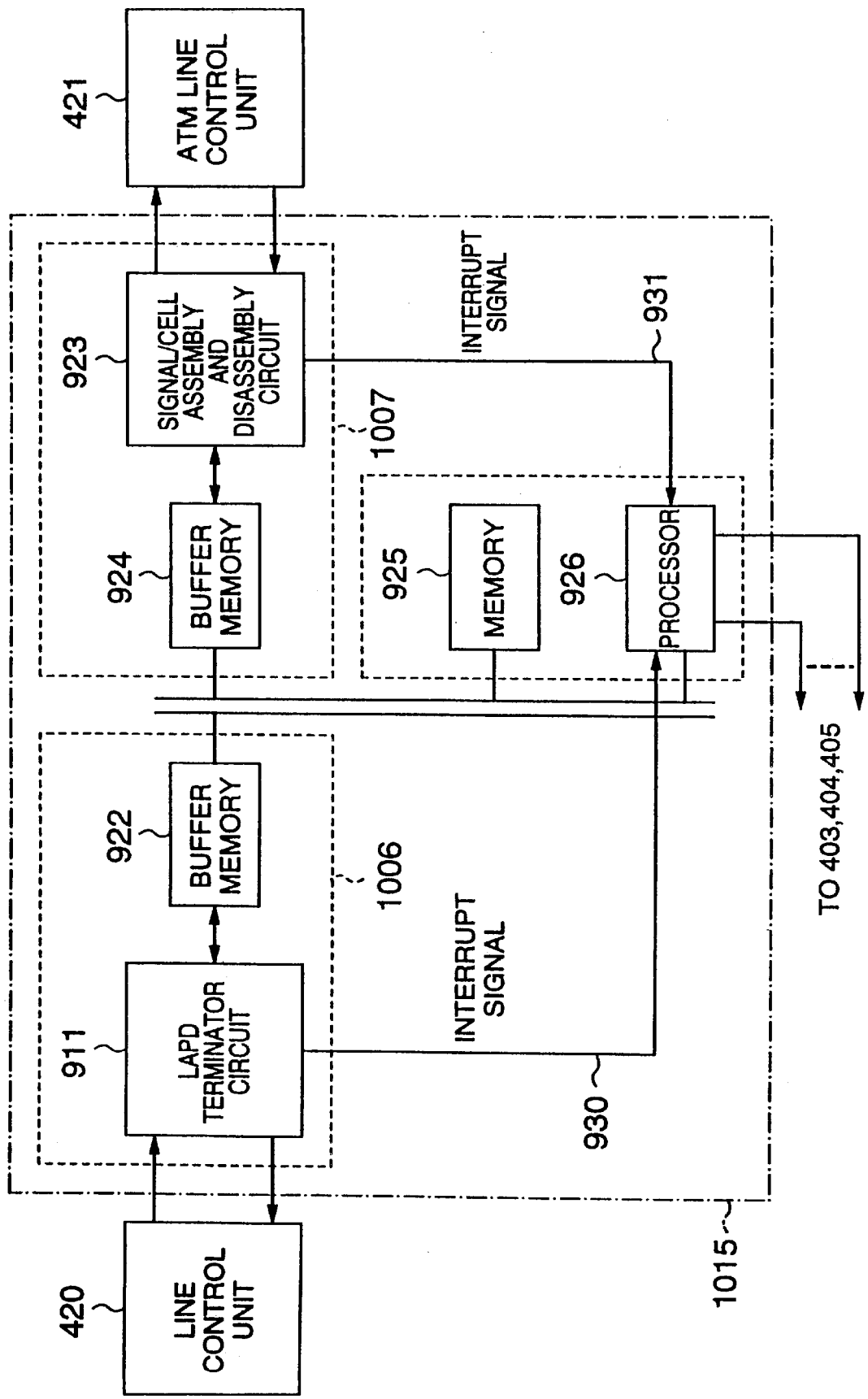
FIG. 10 is a block diagram illustrating the configuration of a signal control unit used in another cell/packet assembly and disassembly apparatus according to the present invention.

FIG. 10 is a block diagram illustrating the internal configuration of the signal control unit 1015. In the signal control unit 1015 of the line conversion apparatus 310a, an LAPD terminal circuit 911 on the line switch board side transmits and receives signals on respective d-channels to and from a line 100a in a line switching system through a line control unit 420, terminates the Layer 2 protocol between the line conversion apparatus 310a and a line 200a in a line switching system, stores Layer 3 frames on Layer 2 frames transmitted from a line switch board 1001a through respective d-channels in a buffer memory 922, and generates an interrupt signal 930 to a processor 926. Also, under the control of the processor 926, the LAPD terminal circuit 911 transmits Layer 2 frames storing Layer 3 frames stored in the buffer memory 922 onto respective d-channels on the line 100a in the line switching system.

A signal/cell assembly and disassembly circuit 923 on the ATM network side terminates the Layer 2 protocol between the line conversion apparatus 310a and the ATM network 400. The signal/cell assembly and disassembly circuit 923 transmits and receives cells to and from signal/cell assembly and disassembly circuits 923 in other line conversion apparatuses 300b, 300c through an ATM line control unit 421, using previously set virtual channels. More specifically, the signal/cell assembly and disassembly circuit 923 in the line conversion apparatus 300a stores the contents of cells received from the signal/cell assembly and disassembly circuits 923 in the other line conversion apparatuses 300b, 300c in the buffer memory 925, and generates an interrupt signal 931 to the processor 926. Also, under the control of the processor 926, the signal/cell assembly and disassembly circuit 923 assembles signals stored in the buffer memory 924 by the processor 926 into cells and transmits the cells to the signal/cell assembly and disassembly circuits 923 in the other line conversion apparatuses 300b, 300c through the AMT line control unit 421 and the ATM network 400.

In the configuration described above, the processor 926 executes the following processing in accordance with programs stored in the memory 925. The processor 926 receives a Layer 3 frame from the line 100a in the line switching system through the buffer memory 922 and writes call control information in the received Layer 3 frame into the buffer memory 924 to relay the call control information received from the line 100a in the line switching system to the signal/cell assembly and disassembly circuits 923 in the other line conversion apparatuses 300b, 300c. Conversely, the processor 926 receives cells from the signal/cell assembly and disassembly circuits 923 in the other line conversion apparatuses 300b, 300c through the buffer memory 924 and writes call control information in the cells into the buffer memory 924 to relay the call control information from the signal/cell assembly and disassembly circuits 923 in the other line conversion apparatuses 300b, 300c to the line 100a in the line switching system. Here, in this embodiment, the processor 926 adds information indicative of a bi-directional virtual channel assigned to a B-channel corresponding to the call control information written into the buffer memory 924, such that call control information on each d-channel and a signal indicative of through which bi-directional virtual channel a signal on a B-channel associated with the call control information is transmitted, are assembled into a cell, and transmitted and received in the form of cell. Conversely, the processor 926 determines a d-channel to which the call control information is to be relayed, based on the information indicative of a bi-directional virtual channel added to the call control information included in cells received from the other line conversion apparatuses 300b, 300c. More specifically, the call control information is relayed to a d-channel corresponding to a B-channel to which signals restored by disassembling cells received through a virtual channel specified by the information indicative of the bi-directional virtual channel are outputted.

For relaying such call control information, the processor 926 monitors the call control information to control the cell assembly and the cell disassembly respectively performed by an AAL1 cell assembly unit 403 and an AAL1 cell disassembly unit 404 similar to those in the aforementioned embodiment.

With the foregoing configuration of this embodiment, respective d-channels on lines 200a, 200b, 200c in respective line switching systems are connected so that completely the same operation as the aforementioned embodiment can be realized.

Alternatively, this embodiment may be modified to dynamically change the relationship between a line switch board and B-channels and d-channels which can be used for transmission and reception of calls to the line switch board as well as the assignment of B-channel and d-channel to a bi-directional virtual channel, which have been described to be permanently determined as shown in FIG. 4. In this case, the processor 926, upon detecting a call setting request transmitted on a particular d-channel of the line 100a in the line switching system, determines a call setting requested line switch board indicated by the call setting request, and assigns an unused bi-directional virtual channel within a plurality of previously prepared bi-directional virtual channels connected to the call setting requested line switch board to a B-channel corresponding to this d-channel. Then, as described above, call control information on this d-channel and information indicative of the bi-directional virtual channel assigned to the B-channel corresponding to the d-channel are assembled into a cell and transmitted.

On the other hand, the processor 926 in the signal control unit 1015 which has received a cell including information indicative of a bi-directional virtual channel together with call control information on a d-channel, assigns one of unused B-channels to the bi-directional virtual channel specified by the information indicative of a bi-directional virtual channel in the cell. Also, this call control information is relayed to the d-channel corresponding to the assigned B-channel. Conversely, the processor 926 adds information indicative of a bi-directional virtual channel, to which a corresponding B-channel is assigned, to call control information received from the d-channel, and relays the cell containing the added information.

In the respective line conversion apparatuses 300a, 300b, 300c, a bi-directional virtual channel assigned to each B-channel by the processor 926 is notified to the ATM header generator unit 405 by the processor 926. The ATM header generator unit 405 determines a virtual channel specified by the header added to a cell including signals on each B-channel, in accordance with the notification.

Additionally, in the foregoing embodiments, the respective line conversion apparatuses 300a, 300b, 300c, 310a, 310b, 310c may be configured to accommodate packet terminals adapted to perform packet communications, such that the respective line conversion apparatuses 300a, 300b, 300c, 310a, 310b, 310c assemble packets into cells and disassemble cells to packets.

Also, in the foregoing embodiments, a packet switching network may be used instead of the ATM network. Further, while in the foregoing embodiments, the interface between the line conversion apparatus and the line switch board has been described as the ISDN primary rate interface, the present invention is similarly applicable when any other interface, for example, 2M-TT or the like is used.

As described above, the present invention can provide a line conversion apparatus which is capable of improving the utilization efficiency of a network such as the ATM network or the like which switches packets or cells.

We claim:

1. A cell sending/receiving method for sending and receiving user information and signal information in cell form between any two line switching systems, said two line switching systems connected with each other through a cell switching system, said cell sending/receiving method comprising the steps of:

sending/receiving a cell including the signal information via a pre-established channel for signal information transmission;

establishing a channel for sending/receiving the user information when detecting communication-starting information in the cell including the signal information;

assembling/disassembling a cell in response to the detected communication-starting information in the cell; and sending/receiving the cell including the user information via the established channel.

2. A cell sending/receiving method according to claim 1, further comprising the step of:

stopping assembling/disassembling a cell including the user information when detecting communication-ending information in the cell including the signal information.

3. A cell sending/receiving method according to claim 1, wherein said channel for signal information transmission and said channel for user information transmission are assigned in advance.

4. A cell sending/receiving method according to claim 1, wherein said channel for signal information transmission and said channel for user information transmission are assigned to non-occupied channels in channels prepared in advance.

5. A cell sending/receiving method according to claim 2, wherein said cell switching system is an asynchronous transfer mode (ATM) network transmitting cells via integrated services digital network (ISDN), wherein said communication-starting information is a call establishing request of layer 3 protocol used in an ISDN, and wherein said communication-ending information is a call disconnection request of layer 3 protocol used in an ISDN.

6. A cell sending/receiving method according to claim 1, wherein when there is no cell to be disassembled, data indicating no cell to be disassembled is output in disassembled signal form.

7. A packet sending/receiving method for sending and receiving user information and signal information in packet form between any two line switching systems, said two line switching systems connected with each other through a packet switching system, said packet sending/receiving method comprising the steps of:

sending/receiving a packet including the signal information via a pre-established channel for signal information transmission;

establishing a channel for sending/receiving the user information when detecting communication-starting information in the packet including the signal information;

assembling/disassembling a packet in response to the detected communication-starting information in the cell; and sending/receiving the packet including the user information via the established channel.

8. A packet sending/receiving method according to claim 7, further comprising the step of:

stopping assembling/disassembling a packet including the user information when detecting communication-ending information in the packet including the signal information.

9. A packet sending/receiving method according to claim 7, wherein said channel for signal information transmission and said channel for user information transmission are assigned in advance.

10. A packet sending/receiving method according to claim 7, wherein said channel for signal information transmission and said channel for user information transmission are assigned to non-occupied channels in channels prepared in advance.

11. A packet sending/receiving method according to claim 7, wherein when there is no packet to be disassembled, data indicating no packet to be disassembled is output.

* * * * *